United States Patent
Vijayvargiya et al.

(10) Patent No.: US 11,201,847 B2
(45) Date of Patent: *Dec. 14, 2021

(54) ADDRESS RESOLUTION PROTOCOL ENTRY VERIFICATION

(71) Applicant: VMware, Inc., Palo Alto, CA (US)

(72) Inventors: Shirish Vijayvargiya, Pune (IN); Sachin Shinde, Pune (IN); Nakul Ogale, Pune (IL); Vasantha Kumar Dhanasekar, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,793

(22) Filed: Nov. 30, 2020

(65) Prior Publication Data

US 2021/0084004 A1 Mar. 18, 2021

Related U.S. Application Data (63) Continuation of application No. 16/660,835, filed on Oct. 23, 2019, now Pat. No. 10,855,644.

(30) Foreign Application Priority Data

Sep. 9, 2019 (IN) .............................. 201941036243

(51) Int. Cl.
*G06F 15/16* (2006.01)
*H04L 29/12* (2006.01)
*H04L 29/06* (2006.01)

(52) U.S. Cl.
CPC .......... *H04L 61/103* (2013.01); *H04L 63/123* (2013.01); *H04L 63/1483* (2013.01); *H04L 63/20* (2013.01)

(58) Field of Classification Search
CPC . H04L 61/103; H04L 63/123; H04L 63/1483; H04L 63/20
See application file for complete search history.

(56) References Cited

U.S. PATENT DOCUMENTS

| | | | | |
|---|---|---|---|---|
| 5,751,971 | A * | 5/1998 | Dobbins ................. | H04L 12/46 709/238 |
| 6,067,620 | A * | 5/2000 | Holden ............... | H04L 63/0218 713/155 |
| 6,751,221 | B1 | 6/2004 | Saito et al. | |

(Continued)

OTHER PUBLICATIONS

Paul Schnackenburg, "A Look at Azure Confidential Computing", Redmond Magazine, Feb. 5, 2019, 8 pages.
(Continued)

*Primary Examiner* — Hieu T Hoang
(74) *Attorney, Agent, or Firm* — Adeli LLP (57) ABSTRACT

In some embodiments, a method receives a first address resolution mapping from a workload and verifies the first address resolution mapping. When the first address resolution mapping is verified, the method adds the first address resolution mapping to a list of address resolution mappings. The list of address resolution mappings includes verified address resolution mappings. The list of address resolution mappings is sent to the workload to allow the workload to verify a second address resolution mapping using the list of verified address resolution mappings.

21 Claims, 6 Drawing Sheets

(56) References Cited

U.S. PATENT DOCUMENTS

| | | | |
|---|---|---|---|
| 7,134,012 B2* | 11/2006 | Doyle | H04L 29/12009 713/151 |
| 7,490,351 B1* | 2/2009 | Caves | H04L 29/12028 726/13 |
| 7,660,287 B2 | 2/2010 | Axelsson et al. | |
| 8,370,933 B1 | 2/2013 | Buckler | |
| 8,407,471 B1* | 3/2013 | Sobel | H04L 61/1511 713/168 |
| 8,621,556 B1 | 12/2013 | Bharali et al. | |
| 8,799,482 B1 | 8/2014 | Stamos | |
| 8,804,729 B1* | 8/2014 | Melman | H04L 63/1466 370/392 |
| 8,879,554 B2* | 11/2014 | Emmadi | H04L 45/74 370/392 |
| 9,300,623 B1 | 3/2016 | Earl et al. | |
| 9,398,045 B2* | 7/2016 | Lee | H04L 63/1466 |
| 9,992,106 B2 | 6/2018 | Wang | |
| 10,142,160 B1 | 11/2018 | Adams et al. | |
| 10,798,048 B2 | 10/2020 | Lim et al. | |
| 10,855,644 B1* | 12/2020 | Vijayvargiya | H04L 63/123 |
| 2003/0037163 A1 | 2/2003 | Kitada et al. | |
| 2003/0070096 A1* | 4/2003 | Pazi | H04L 63/1458 726/4 |
| 2003/0163722 A1* | 8/2003 | Anderson, IV | H04L 61/6009 726/3 |
| 2004/0059909 A1* | 3/2004 | Le Pennec | H04L 63/12 713/153 |
| 2006/0062141 A1* | 3/2006 | Oran | H04L 12/2854 370/216 |
| 2006/0088037 A1* | 4/2006 | Finley, Jr. | H04L 61/10 370/395.54 |
| 2006/0206611 A1* | 9/2006 | Nakamura | H04L 61/103 709/226 |
| 2006/0209818 A1* | 9/2006 | Purser | H04L 29/12009 370/389 |
| 2007/0110068 A1 | 5/2007 | Sekiguchi et al. | |
| 2007/0150341 A1 | 6/2007 | Zia et al. | |
| 2007/0153738 A1* | 7/2007 | Barker, Jr. | H04W 40/36 370/331 |
| 2007/0192858 A1* | 8/2007 | Lum | H04L 29/12028 726/22 |
| 2007/0248085 A1* | 10/2007 | Volpano | H04L 29/12028 370/389 |
| 2007/0261112 A1 | 11/2007 | Todd et al. | |
| 2008/0043761 A1 | 2/2008 | Kumar et al. | |
| 2008/0080512 A1 | 4/2008 | Gofman et al. | |
| 2008/0195700 A1* | 8/2008 | Jonsson | H04L 29/12811 709/203 |
| 2009/0025077 A1 | 1/2009 | Trojanowski | |
| 2009/0028144 A1 | 1/2009 | Blair | |
| 2009/0089426 A1 | 4/2009 | Yamasaki et al. | |
| 2009/0198800 A1* | 8/2009 | Dighe | H04L 29/12028 709/221 |
| 2010/0107250 A1* | 4/2010 | Li | H04L 63/1466 726/22 |
| 2010/0121981 A1 | 5/2010 | Drako | |
| 2010/0141402 A1 | 6/2010 | Eun et al. | |
| 2010/0199122 A1 | 8/2010 | Sood | |
| 2011/0035784 A1 | 2/2011 | Jakobsson | |
| 2011/0066807 A1 | 3/2011 | Hay et al. | |
| 2011/0194563 A1* | 8/2011 | Shen | H04L 67/1002 370/395.52 |
| 2011/0299537 A1 | 12/2011 | Saraiya et al. | |
| 2011/0317703 A1 | 12/2011 | Dunbar et al. | |
| 2011/0321139 A1* | 12/2011 | Jayaraman | G06F 21/51 726/4 |
| 2012/0011584 A1* | 1/2012 | Kwan | H04L 63/1466 726/13 |
| 2012/0096166 A1 | 4/2012 | Devarapalli et al. | |
| 2012/0254996 A1 | 10/2012 | Wilbourn et al. | |
| 2012/0297478 A1 | 11/2012 | Martin et al. | |
| 2013/0034097 A1 | 2/2013 | Dharmapurikar et al. | |
| 2013/0044636 A1 | 2/2013 | Koponen et al. | |
| 2013/0044754 A1* | 2/2013 | Zhu | H04L 29/12028 370/392 |
| 2013/0061047 A1 | 3/2013 | Sridharan et al. | |
| 2013/0103784 A1 | 4/2013 | Lyon | |
| 2013/0107889 A1* | 5/2013 | Barabash | H04L 61/103 370/409 |
| 2013/0243004 A1* | 9/2013 | Hikichi | H04L 61/103 370/401 |
| 2013/0291101 A1 | 10/2013 | Karasaridis | |
| 2013/0308641 A1 | 11/2013 | Ackley | |
| 2013/0347095 A1* | 12/2013 | Barjatiya | H04L 43/08 726/13 |
| 2014/0022936 A1* | 1/2014 | Robitaille | H04L 61/2007 370/254 |
| 2014/0089523 A1 | 3/2014 | Roy et al. | |
| 2014/0195666 A1* | 7/2014 | Dumitriu | H04L 41/5038 709/223 |
| 2014/0325651 A1* | 10/2014 | Kim | H04L 63/1466 726/23 |
| 2015/0016469 A1 | 1/2015 | Ganichev et al. | |
| 2015/0032691 A1 | 1/2015 | Hall et al. | |
| 2015/0043581 A1 | 2/2015 | Devireddy et al. | |
| 2015/0058968 A1 | 2/2015 | Wang et al. | |
| 2015/0074221 A1 | 3/2015 | Kuparinen et al. | |
| 2015/0106489 A1 | 4/2015 | Duggirala | |
| 2015/0215265 A1 | 7/2015 | Lim | |
| 2015/0312118 A1 | 10/2015 | Behera et al. | |
| 2015/0350043 A1 | 12/2015 | Kovács et al. | |
| 2015/0358276 A1 | 12/2015 | Liu et al. | |
| 2016/0012008 A1* | 1/2016 | Akiyoshi | H04L 49/30 709/213 |
| 2016/0026796 A1 | 1/2016 | Monrose et al. | |
| 2016/0173441 A1 | 6/2016 | Lee et al. | |
| 2016/0197898 A1 | 7/2016 | Hozza et al. | |
| 2016/0226817 A1 | 8/2016 | Kang et al. | |
| 2016/0241509 A1 | 8/2016 | Akcin | |
| 2016/0248728 A1 | 8/2016 | Evans | |
| 2016/0255012 A1 | 9/2016 | Mizrachi et al. | |
| 2016/0301655 A1* | 10/2016 | Lim | H04L 61/6009 |
| 2016/0330230 A1 | 11/2016 | Reddy et al. | |
| 2016/0337236 A1* | 11/2016 | Hsu | H04L 29/12028 |
| 2017/0093912 A1* | 3/2017 | Poomalai | H04L 63/1466 |
| 2017/0142060 A1 | 5/2017 | Thakar | |
| 2017/0264590 A1 | 9/2017 | Xing | |
| 2017/0272454 A1 | 9/2017 | Seo et al. | |
| 2017/0310709 A1 | 10/2017 | Foxhoven et al. | |
| 2018/0027012 A1* | 1/2018 | Srinivasan | H04L 63/101 726/4 |
| 2018/0034827 A1 | 2/2018 | Kaliski, Jr. et al. | |
| 2018/0219833 A1 | 8/2018 | Reddy | |
| 2018/0343122 A1* | 11/2018 | Spacek | H04L 9/14 |
| 2019/0081958 A1 | 3/2019 | Lee | |
| 2019/0238504 A1 | 8/2019 | Gupta et al. | |
| 2019/0306166 A1 | 10/2019 | Konda et al. | |
| 2020/0167281 A1 | 5/2020 | Flores et al. | |
| 2020/0213265 A1 | 7/2020 | Deshpande et al. | |
| 2020/0228495 A1 | 7/2020 | Ogale et al. | |

OTHER PUBLICATIONS

VMware,"Securing Windows Guest Operating Systems with Virtualization-based Security", VMware Docs, May 31, 2019, 2 pages.

Microsoft, "Virtualization-based Security (VBS)", Hardware Dev Center, Oct. 4, 2017, 4 pages.

Related Application, Shirish Vijayvargiya et al., entitled "Domain Name Service (DNS) Server Cache Table Validation", India Patent Application No. 202041010541, filed Mar. 12, 2020, 44 pages.

Related Application, Shirish Vijayvargiya et al., entitled "Domain Name Service (DNS) Server Cache Table Validation", U.S. Appl. No. 16/874,706, filed May 15, 2020, 44 pages.

Olzak, Tom, "DNS Cache Poisoning: Definition and Prevention," Mar. 2006, 9 pages, www.infosecwriters.com.

Plummer, David, "An Ethernet Address Resolution Protocol or Converting Network Protocol Addresses to 48.bit Ethernet Address for Transmission on Ethernet Hardware," RFC 826, Nov. 1982, 10 pages.

(56) References Cited

OTHER PUBLICATIONS

Trostle, Jonathan, et al., "Protecting Against DNS Cache Poisoning Attacks," 2010 6th IEEE Workshop on Secure Network Protocols, Oct. 5, 2010, 6 pages, IEEE, Kyoto, Japan.

Xi, Yu, et al., "Recovering and Protecting Against DNS Cache Poisoning Attacks," 2011 International Conference of Information Technology, Computer Engineering, and Management Sciences, Sep. 24-25, 2011, 4 pages, IEEE, Nanjing, China.

Yuan, Lihua, et al., "DoX: A Peer-to-Peer Antidote for DNS Cache Poisoning Attacks," 2006 IEEE International Conference on Communications, Jun. 11-15, 2006, 6 pages, IEEE, Istanbul, Turkey.

* cited by examiner

ADDRESS RESOLUTION PROTOCOL ENTRY VERIFICATION

CROSS REFERENCE TO RELATED APPLICATIONS

This application is a continuation application and, pursuant to 35 U.S.C. § 120, is entitled to and claims the benefit of earlier filed application U.S. application Ser. No. 16/660,835 filed Oct. 23, 2019 (U.S. Pat. No. 10,855,644), which claims the benefit under 35 U.S.C. 119(a)-(d) to Foreign Application Serial No. 201941036243 filed in India entitled "ADDRESS RESOLUTION PROTOCOL ENTRY VERIFICATION", on Sep. 9, 2019, by VMWARE, Inc., the content of all of which is incorporated herein by reference in their entirety for all purposes.

BACKGROUND

Address resolution protocol (ARP) is a communication protocol that is used to resolve an address, such as a layer 3 address (e.g., an Internet protocol (IP) address), to another address, such as a layer 2 address (e.g., a media access control (MAC) address). A network device may use an ARP cache to store address resolution mappings, such as IP address to MAC address resolution mappings. When a first network device is sending a packet with a destination IP address, the first network device looks up the IP address in the ARP cache to find the MAC address of a second network device. If a mapping is not found for the IP address, the first network device sends an ARP request to network devices on the network requesting a MAC address for the IP address. The second network device may respond with its MAC address and IP address. The first network device may then insert an entry in its ARP cache for the address resolution mapping of the IP address to the MAC address for the second network device for future use.

An attack on the ARP cache may exploit vulnerabilities in the address resolution protocol. For example, an attacker may attempt to divert packets away from legitimate network devices to the attacker's network devices. In some examples, the attack may associate a MAC address of the attacker's network device with an IP address of a legitimate network device. Accordingly, any packets destined for a target network device are sent to the attacker's network device due to the resolution of the IP address of the target network device to the MAC address of the attacker's network device. The attacker may then perform some undesired action, such as inspecting the packets (e.g., spying), while forwarding the packets to the actual target network device after the inspection to avoid discovery, modifying the data before forwarding the packets (e.g., a man-in-the-middle attack), or launching a denial of service attack by causing some or all packets from a network to be dropped.

The attack may be successful because the attack exploits the lack of authentication in the ARP protocol by sending spoofed ARP messages in the network. The ARP spoof attack is run from a compromised network device on the network or from an attacker's network device connected directly to the network. The attack may flood a network device with incorrect ARP packets until the ARP cache of the network device is overwhelmed and only contains the new IP address to MAC address resolution mapping that the attacker has injected. Basically, without authentication, the attacker can override the IP address to MAC address resolution mappings in the ARP cache with its own IP address to MAC address resolution mappings.

DETAILED DESCRIPTION

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

Some embodiments verify address resolution mappings, such as address resolution protocol (ARP) mappings, using a security agent. In some embodiments, the security agent may be stored in a secure area, such as a secure enclave, which isolates the security agent from other processes that are running on an operating system of a host system and the security agent is not accessible to operating system. The security agent may operate in a first phase, such as a learning phase, to intercept ARP requests and ARP responses that are sent by a workload. The security agent may send the address resolution mappings from the ARP responses, such as a mapping of an Internet protocol (IP) address to a media access control (MAC) address, to a policy manager. The policy manager can then verify the address resolution mappings using a trusted source. The verification may verify whether an address resolution mapping is valid or invalid based on a comparison with address resolution mappings from the trusted source. The policy manager may then send a response to the security agent which can perform an action based on the response. For example, if the address resolution mapping is valid, the workload is allowed to use the address resolution mapping to send a packet to the network device using the MAC address. If the address resolution mapping is denied as invalid, the workload does is not allowed to use the address resolution mapping to send a packet to the network device. Also, during the learning phase, the policy manager creates a whitelist policy that lists valid address resolution mappings for the workload based on receiving one or more address resolution mappings from the security agent.

Upon transitioning from the first phase to a second phase, such as from a learning phase to a detection phase, the policy manager sends the whitelist policy to the security agent. For example, the learning phase may last a period of time, such as a number of weeks, and after which, the workload switches to the detection phase. In the detection phase, when the security agent intercepts an ARP request and receives an ARP response with an address resolution mapping, the security agent can then compare the address resolution mapping with address resolution mappings in the whitelist policy. If an address resolution mapping for an IP address is resolved to a different MAC address than that listed in an address resolution mapping in the whitelist policy, the security agent detects a change in the MAC address. Then, the security agent may perform an action, such as outputting an alert of the change to the policy manager. Further, the security agent may cause the workload to not use the address resolution mapping to send packets.

Accordingly, the security agent verifies the ARP requests/ARP responses using the whitelist policy. Any attempted attacks on the ARP cache of a workload may be detected and an alert generated. Also, the ARP attacks may be detected before any address resolutions in the ARP cache are changed.

System Overview

Figure 1:
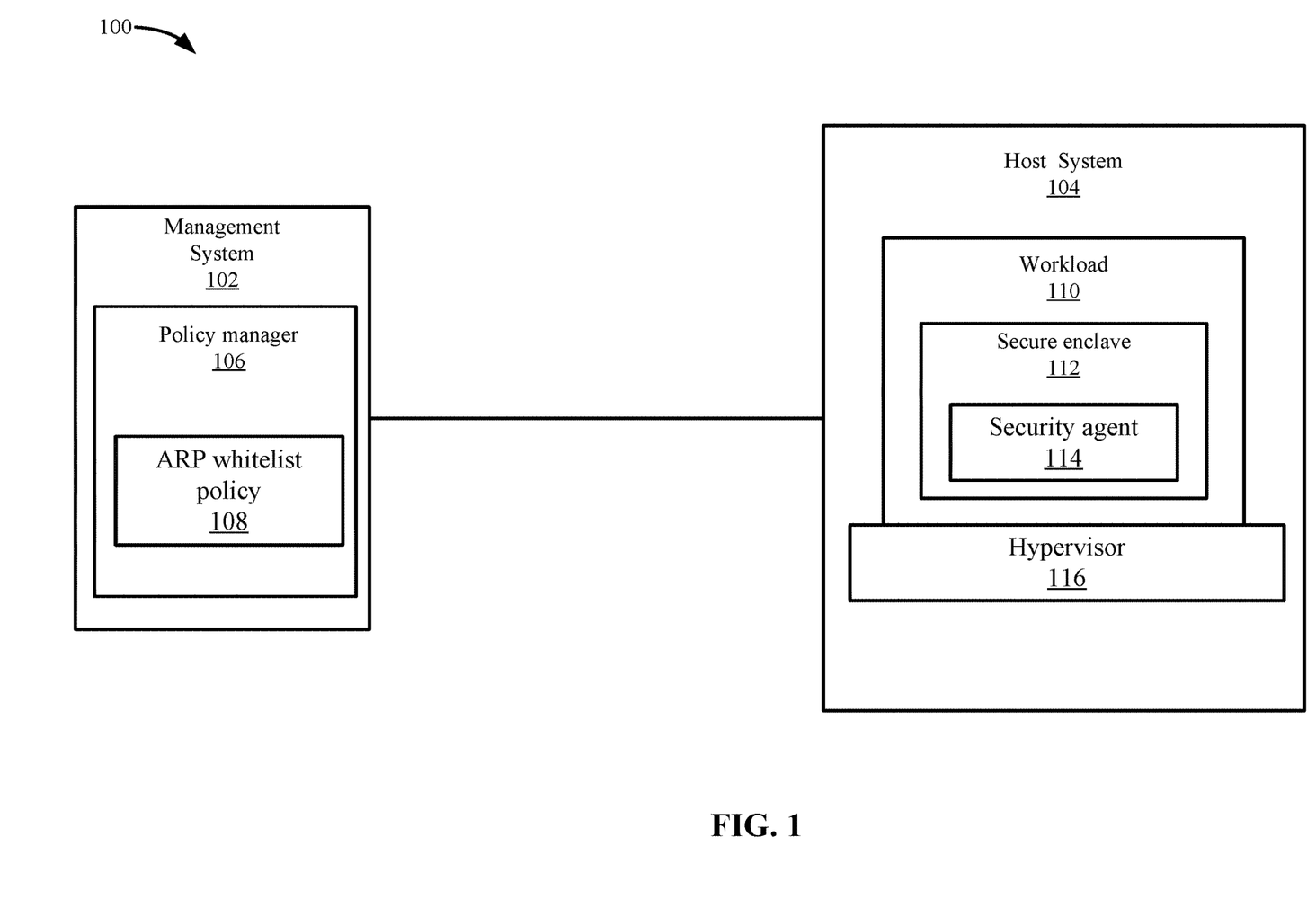
FIG. 1 depicts a simplified system for an address resolution security process according to some embodiments.

FIG. 1 depicts a simplified system 100 for an address resolution security process according to some embodiments. System 100 includes a management system 102 and a host system 104. Although one management system 102 and one host system 104 are described, multiple instances of management systems and host systems may be appreciated. For example, management system 102 may perform the process described for multiple host systems 104.

Host system 104 may include a workload 110 in addition to other workloads (not shown). Workloads may refer to virtual machines that are running on a respective host, but this is one example of a virtualized computing instance or compute node. Any suitable technology may be used to provide a workload. Workloads may include not only virtual machines, but also containers (e.g., running on top of a host or guest operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers. Although a virtualized environment is described, some embodiments may be used in an environment that is not virtualized.

A security agent 114 may be associated with workload 110. In some embodiments, security agent 114 may be installed in workload 110. However, security agent 114 may be installed in other locations, such as in a hypervisor 116, another workload, etc.

In some embodiments, host system 104 installs security agent 114 in a secure area, such as by using an enclave-based technology to install security agent 114 in a secure enclave 112. Secure enclave 112 may run software code for security agent 114 in the same context as workload 110, but secure enclave 112 keeps the software code for security agent 114 completely isolated from other processes running on workload 110, an operating system of workload 110, or other processes running on host system 104. For example secure enclave 112 may be implemented in a Guest Monitoring Mode (GMM) that provides a special mode that keeps the software code for security agent 114 completely isolated from other processes running on workload 110, an operating system of workload 110, or other processes running on host system 104. In other embodiments, virtualization-based security (VBS) may be used to generate the secure enclave. In some embodiments, secure enclave 112 is created in workload 110 using a hypervisor-based enclave technology, which may be a region of memory in the guest memory address space of workload 110 that is isolated from, and thus inaccessible by, other processes running in workload 110 (including privileged processes such as the workload's guest operating system kernel). Thus, any code running in secure enclave 112 may not be compromised via attacks within workload 110, including attacks that target the guest operating system. The memory assigned to secure enclave 112 may be invisible to other processes running in workload 110, and memory may not be accessed by processes running in workload 110. Although secure enclave 112 is discussed, a secure enclave may not be used and software code of security agent 114 may be accessible to other processes. Also, other methods of securing the software code of security agent 114 may be appreciated.

Security agent 114 may communicate with a policy manager 106 to verify address resolution mappings as will be described in more detail below. Policy manager 106 may be located remotely from host system 104 on management system 102, but policy manager 106 may be located in different locations. Also, policy manager 106 may develop an ARP whitelist policy 108 for workload 110. In some embodiments, policy manager 106 generates a workload-specific ARP whitelist policy 108 that is specific to workload 110. Also, policy manager 106 may generate whitelist policies that are specific to other workloads using the same process as will be described in more detail below.

Security agent 114 may operate in multiple phases, but multiple phases may not be used. In some embodiments, a first phase, which may be referred to as a learning phase, is performed to learn an ARP whitelist policy 108. Then, security agent 114 performs a second phase, which may be referred to as a detection phase, to detect possible malicious address resolution mappings. The following will describe the learning phase and then the detection phase.

Learning Phase

Figure 2:
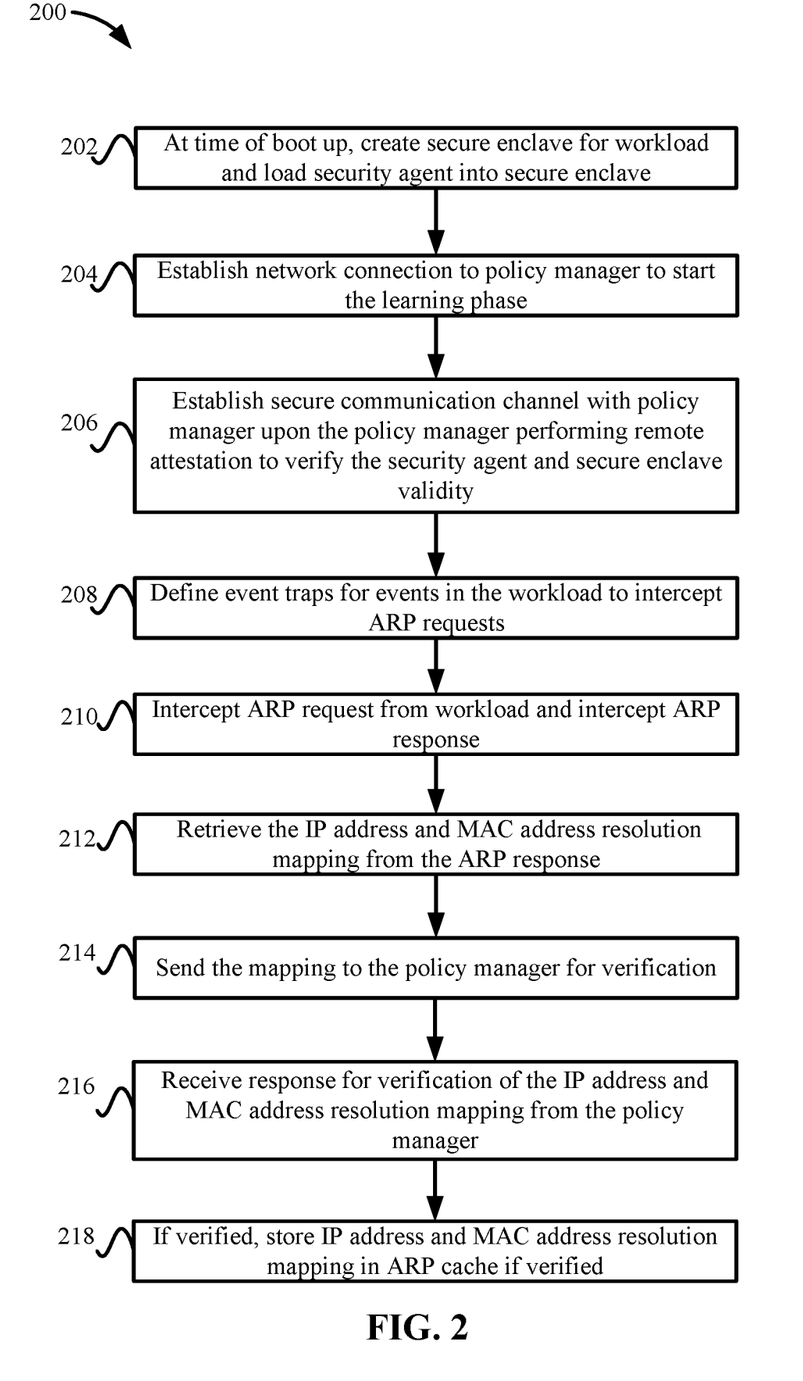
FIG. 2 depicts a simplified flowchart of the learning phase at a security agent according to some embodiments.

FIG. 2 depicts a simplified flowchart 200 of the learning phase at security agent 114 according to some embodiments. At 202, host system 104 creates a secure environment, such as secure enclave 112, for workload 110 and loads software code for security agent 114 in secure enclave 112 at the time of boot-up. Security agent 114 may be installed at the time of boot-up of workload 110, or at other times.

At 204, security agent 114 establishes a network connection to policy manager 106 to start the learning phase. The network connection may be a secure connection between security agent 114 and policy manager 106. The secure connection may be protected against outside attacks.

At 206, security agent 114 establishes a secure communication channel with policy manager 106 upon policy manager 106 performing remote attestation to verify the validity of security agent 114 and secure enclave 112. In some embodiments, policy manager 106 may verify that the correct security agent 114 is loaded into the correct secure enclave 112 in workload 110. For example, policy manager 106 may verify the identity of security agent 114 that has been loaded into a secure enclave. Also, policy manager 106 may verify secure enclave 112 is configured correctly. Then, policy manager 106 may establish the secure communication channel with security agent 114, which protects the communications between policy manager 106 and security agent 114. The secure communication channel may be established using known cryptography or other secure processes.

At 208, security agent 114 defines information, such as event traps, for events in workload 110 such that security agent 114 receives information for intercepted ARP requests. For example, the event traps may intercept (or trap) communications sent to workload 110 and from workload 110. For example, ARP responses are redirected to a chain on which security agent 114 listens and can review the ARP responses. In this way, the security agent traps the ARP response. Also, the event traps are for network/socket-related events in workload 110, which may capture packets being sent to workload 110 and from workload 110. Also, security agent 114 may use hooks for send/receive/read/write system calls from workload 110 and IP address change calls to capture workload traffic. Although the above method of intercepting packets is described, various methods may be used to intercept the address resolution mapping.

Upon the above set-up, security agent 114 may perform the learning process for generating ARP whitelist policy 108 according to some embodiments. The following process may be performed for a number of ARP requests and ARP responses over a period of time, such as days, weeks, etc., according to some embodiments. At 210, security agent 114 intercepts an ARP request from workload 110 and intercepts a subsequent ARP response to the ARP request. The ARP request may be a request sent by workload 110 requesting a mapping from a layer 3 address (e.g., an IP address) to a layer 2 address (e.g., a MAC address). The layer 3 address may be a logical address and the layer 2 address may be a physical address. A network device associated with the IP address may then respond with its MAC address in the ARP response. IP addresses and MAC addresses will be used for discussion purposes, but some embodiments may be used for other address resolution mappings.

At 212, security agent 114 retrieves the IP address and MAC address resolution mapping from the ARP response. Then, at 214, security agent 114 sends the address resolution mapping to policy manager 106 for verification. Along with the address resolution mapping, security agent 114 may send the IP address of workload 110, a network interface card identifier, and other information related to workload 110 to policy manager 106. For example, security agent 114 may send a sub-network address associated with workload 110, the MAC address of workload 110, a gateway or router IP address, and/or a gateway or router MAC address associated with workload 110 to policy manager 106. During the learning mode, security agent 114 may send the address resolution mapping received in an ARP response to policy manager 106 for verification before allowing any communications using the address resolution mapping. This may ensure that an attacker cannot send an incorrect address resolution mapping without verification.

As will be discussed in more detail below, policy manager 106 may verify the IP address and MAC address resolution mapping. Then, at 216, security agent 114 receives a response for the verification of the IP address and MAC address resolution mapping from policy manager 106. If verified, at 218, security agent 114 stores the IP address and MAC address resolution mapping in its ARP cache. The address resolution mappings in the ARP cache may include an IP address, a MAC address, and a network interface card identifier. If the IP address and MAC address resolution mapping is not verified, security agent 114 may not store the IP address and MAC address resolution mapping in its ARP cache.

Figure 3:
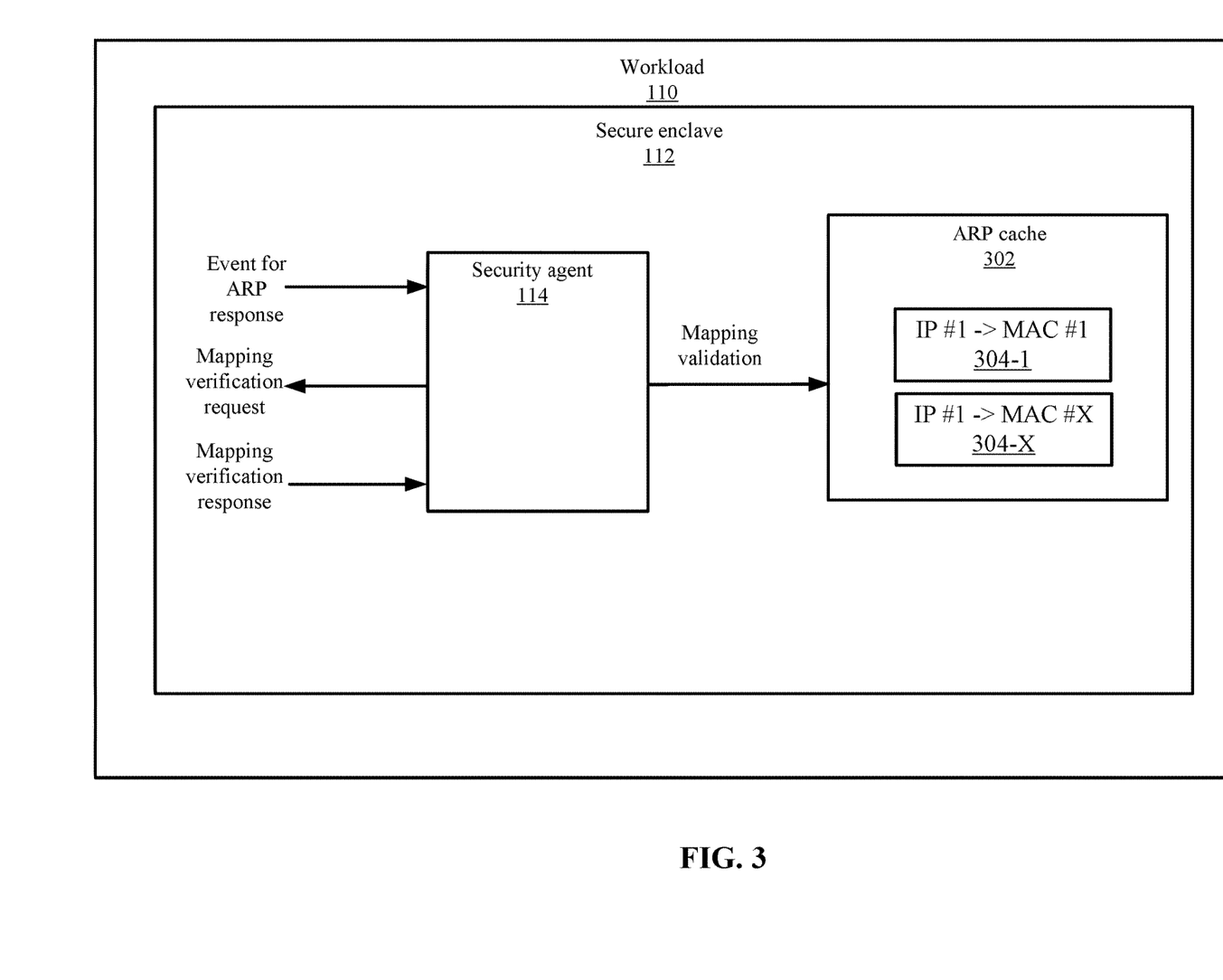
FIG. 3 depicts a more detailed example of a workload during the learning process according to some embodiments.

FIG. 3 depicts a more detailed example of workload 110 during the learning process according to some embodiments. Security agent 114 may trap an event related to an ARP response. For example, workload 110 may attempt to change the ARP cache to include a new entry or change an existing entry and workload 110 intercepts this request.

Upon detecting the event, security agent 114 sends a mapping verification request and then receives a mapping verification response. Upon receiving the mapping verification response, security agent 114 may take different actions. For example, security agent 114 may verify entries in an ARP cache 302 for workload 110. ARP cache 302 may include a table that stores address resolution mappings 304-1 to 304-X. Depending on the verification, security agent 114 may validate an entry or invalidate an entry. The validation of the entry may allow insertion of the entry in ARP cache 302 or if the entry has already been inserted, security agent 114 may not modify the entry, or may indicate that the entry is validated. If the entry is not validated, security agent 114 may invalidate the entry in ARP cache 302, such as by removing the entry or storing information that invalidates the entry. If the entry has not already been stored in ARP cache 302, then security agent 114 may not store the address resolution mapping in ARP cache 302.

Figure 4:
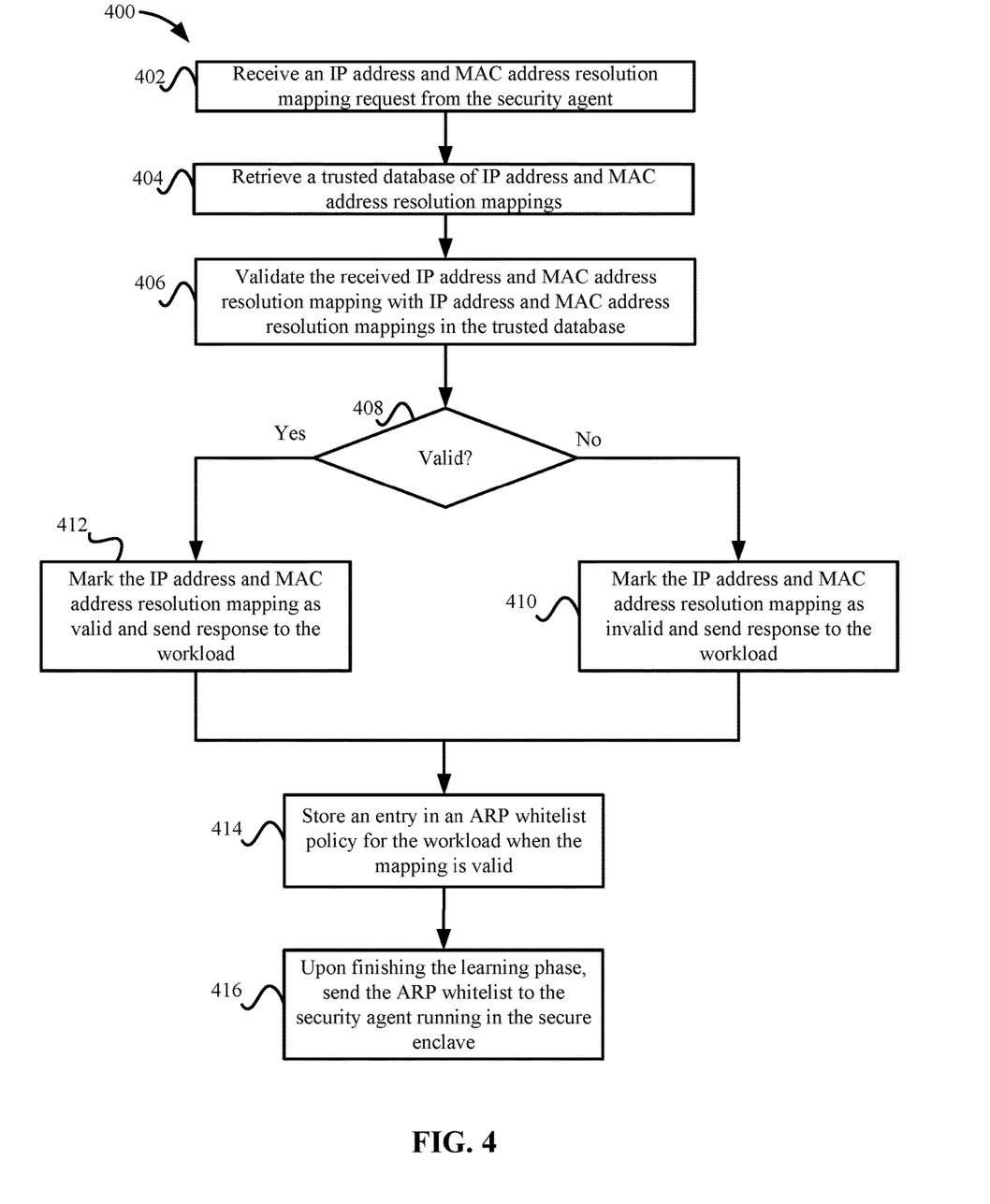
FIG. 4 depicts a simplified flowchart of a method for verifying address resolution mappings at a policy manager according to some embodiments.

When policy manager 106 receives the address resolution mapping, policy manager 106 performs a verification process during the learning phase, which will now be described in more detail. FIG. 4 depicts a simplified flowchart 400 of a method for verifying address resolution mappings at policy manager 106 according to some embodiments. At 402, policy manager 106 receives an IP address and MAC address resolution mapping request from security agent 114. The request may include the IP address and MAC address resolution mapping. Also, the request may include identification information for workload 110, such as the IP address and MAC address of workload 110, the network interface card identifier, and other identifying information. The identification information allows policy manager 106 to develop an ARP whitelist policy 108 that is specific to workload 110.

At 404, policy manager 106 receives a trusted database of IP address and MAC address resolution mappings. The trusted database may be generated by a trusted source and is a source of truth for IP address and MAC address resolution mappings. For example, the trusted database may be created in different ways. For example, a valid mapping of IP and MAC addresses may be received from a user for workloads 110 in system 100, such as workloads in a data center. Also, the trusted database may include IP address and MAC address resolution mappings that are sent to policy manager 106 at the boot-up time of workloads. Also, the workloads may provide a gateway address and subnet mask, and an network interface card identifier. The IP address and MAC address resolution mappings that are included in ARP cache 302 at boot-up may be taken as a source of truth because workload 110 has just booted-up and may not have been subject to an attack. It could be assumed that the IP address and MAC address resolution mappings loaded in the ARP cache on a new workload 110 may be trusted. The trusted database may also be received from third parties, or generated in other ways.

At 406, policy manager 106 verifies the received IP address and MAC address resolution mapping with IP address and MAC address resolution mappings in the trusted database. For example, policy manager 106 uses the trusted IP address and MAC address resolution mapping to verify that the MAC address in the received IP address and MAC address resolution mapping is not attempting to change the MAC address in the IP address and MAC address resolution mapping in the trusted database.

When the MAC address is associated with network devices in the same sub-network or local area network, the MAC address is for the destination network device in which a packet is sent. The cache entry with the IP address and MAC address resolution mapping may be created when the destination network device and the source network device are both in the same sub-network.

In the case where the destination network device and the source network device are in a different network connected via a router or gateway, policy manager 106 may use a gateway IP address and gateway MAC address resolution mapping that is published by security agent 114 at boot-up to approve the received IP address and MAC address resolution mapping. The gateway IP address and the gateway MAC address resolution mapping are used because the packet may specify the gateway IP address and gateway MAC address as a destination when sending or receiving a packet to or from a destination host system that is in a different network connected via the router or gateway. For an unknown mapping that is not in the trusted database, policy manager 106 may perform other verification actions, such as requesting input from a user. The user may perform a manual verification of the IP address and MAC address resolution mapping.

At 408, policy manager 106 determines if the received IP address and MAC address resolution mapping is valid. If the received IP address and MAC address resolution mapping is not valid, at 410, policy manager 106 marks the IP address and MAC address resolution mapping as invalid and sends a response to workload 110. The IP address and MAC address resolution mapping may not be valid when the IP address resolves to a different MAC address than found in a corresponding mapping in the trusted database. Also, the IP address and MAC address resolution mapping may not be valid when IP address and MAC address resolution mapping is not found in the trusted database.

If the IP address and MAC address resolution mapping is valid, at 412, policy manager 106 marks the IP address and MAC address resolution mapping as valid and sends a response to workload 110. The IP address and MAC address resolution mapping may be valid when the IP address resolves to the same MAC address in the trusted database. At 414, policy manager 106 stores an entry in an ARP whitelist policy for workload 110 when the mapping is valid. ARP whitelist policy 108 may be generated for specific workloads based on the ARP verification requests. ARP whitelist policy 108 may specify valid IP address and MAC address resolution mappings for a specific workload 110.

At 416, upon finishing the learning phase, policy manager 106 sends ARP whitelist policy 108 to security agent 114. Policy manager 106 may include IP address and MAC address resolution mappings in ARP whitelist policy 108 that have been marked as valid and may not include IP address and MAC address resolution mappings that have been marked as invalid in ARP whitelist policy 108. Also, in some embodiments, policy manager 106 may include IP address and MAC address resolution mappings that are in the trusted database that have not been verified in the learning phase. In some embodiments, these IP address and MAC address resolution mappings have not been invalidated, and policy manager 106 may assume they are valid since the IP address and MAC address resolution mappings were loaded into the trusted database when workload 110 booted-up. The process may then proceed to the detection phase.

Detection Phase

Figure 5:
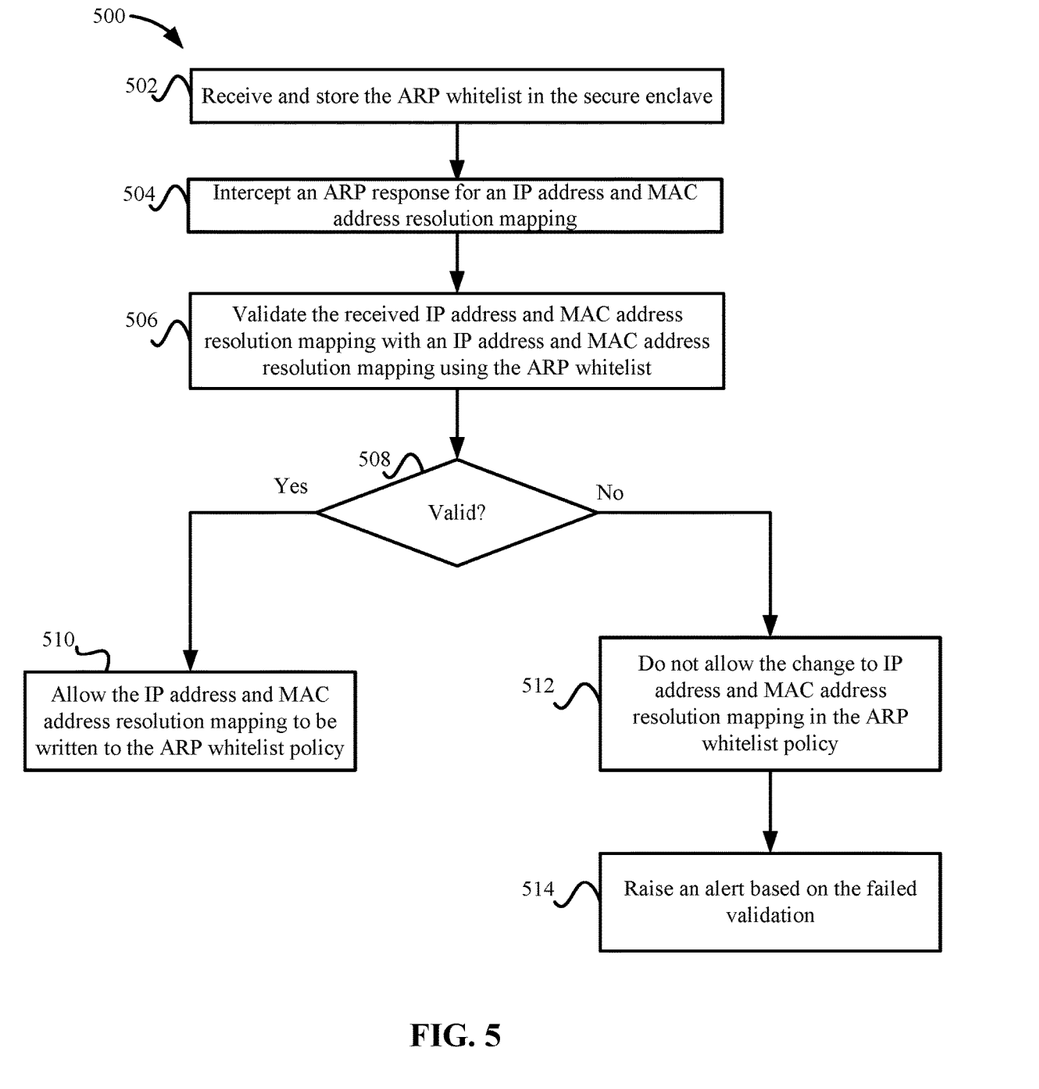
FIG. 5 depicts a simplified flowchart of a method for validating IP address and MAC address resolution mappings in the detection phase according to some embodiments.

FIG. 5 depicts a simplified flowchart 500 of a method for validating IP address and MAC address resolution mappings in the detection phase according to some embodiments. Unlike the learning phase, security agent 114 may perform the verification using ARP whitelist policy 108 that is received from policy manager 106. This may remove the requirement of communicating with policy manager 106 to verify an IP address and MAC address resolution mapping after intercepting an ARP response.

At 502, security agent 114 receives and stores ARP whitelist policy 108 in secure enclave 112. ARP whitelist policy 108 may overwrite entries in an existing ARP table in ARP cache 302. For example, any IP address and MAC address resolution mappings that were stored in ARP cache 302 during the learning phase may be replaced by ARP whitelist policy 108. ARP whitelist policy 108 may list information that is used to look up an address resolution mapping, such as an IP address, a MAC address, and an identifier for a network interface card.

At 504, security agent 114 may intercept an ARP response for an IP address and MAC address resolution mapping. At 506, security agent 114 may verify the received IP address and MAC address resolution mapping with an IP address and MAC address resolution mapping in ARP whitelist policy 108. Security agent 114 may perform the verification by comparing the IP address, the MAC address, and the network interface card values in the ARP response to IP address, MAC address, and network interface card values in ARP whitelist policy 108. For example, for the same IP address in the ARP whitelist policy 108 as found in the IP address and MAC address resolution mapping, security agent 114 determines the associated MAC address, and compares that MAC address from ARP whitelist policy 108 to the MAC address in the ARP response. Security agent 114 can then determine if the ARP response is attempting to change the MAC address for the IP address and MAC address resolution mapping in ARP whitelist policy 108. Accordingly, at 508, security agent 114 determines if the received IP address and MAC address resolution mapping is valid. For example, if the ARP response is not trying to change a MAC address in the IP address and MAC address resolution mapping, the ARP response is valid, and at 510, security agent 114 may allow the IP address and MAC address resolution mapping to be written to ARP whitelist policy 108. Packets can then be sent using the IP address and MAC address resolution mapping.

If the ARP response is attempting to change a MAC address, security agent 114 determines that the ARP response is not verified, and at 512, security agent 114 performs an action, such as security agent 114 does not allow the change to the IP and MAC address resolution mapping in ARP whitelist policy 108. Additionally, at 514, security agent 114 may raise an alert based on the failed verification. By not allowing the change to the IP address and MAC address resolution mapping in ARP whitelist policy 108, an attacker cannot change the MAC address in an IP address and MAC address resolution mapping to a MAC address of the attacker's network device. Further, security agent 114 may send the alert to policy manager 106 or another device, or to an administrator. Then, policy manager 106 may take remediation action. For example, policy manager 106 may compare the IP address and MAC address resolution mapping to other IP address and MAC address resolution mappings published by other workloads during the learning phase to verify the update. If policy manager 106 does not find a reported MAC address belonging to any device where a security agent 114 is running, policy manager 106 may increase the severity of the alert. Further, policy manager 106 may increase the severity of the alert when the unknown MAC address is reported by multiple security agents 114 in multiple workloads 110. Security agent 114 may also perform an action based on ARP whitelist policy 108, such as disallowing the change to the MAC address in ARP whitelist policy 108.

Figure 6:
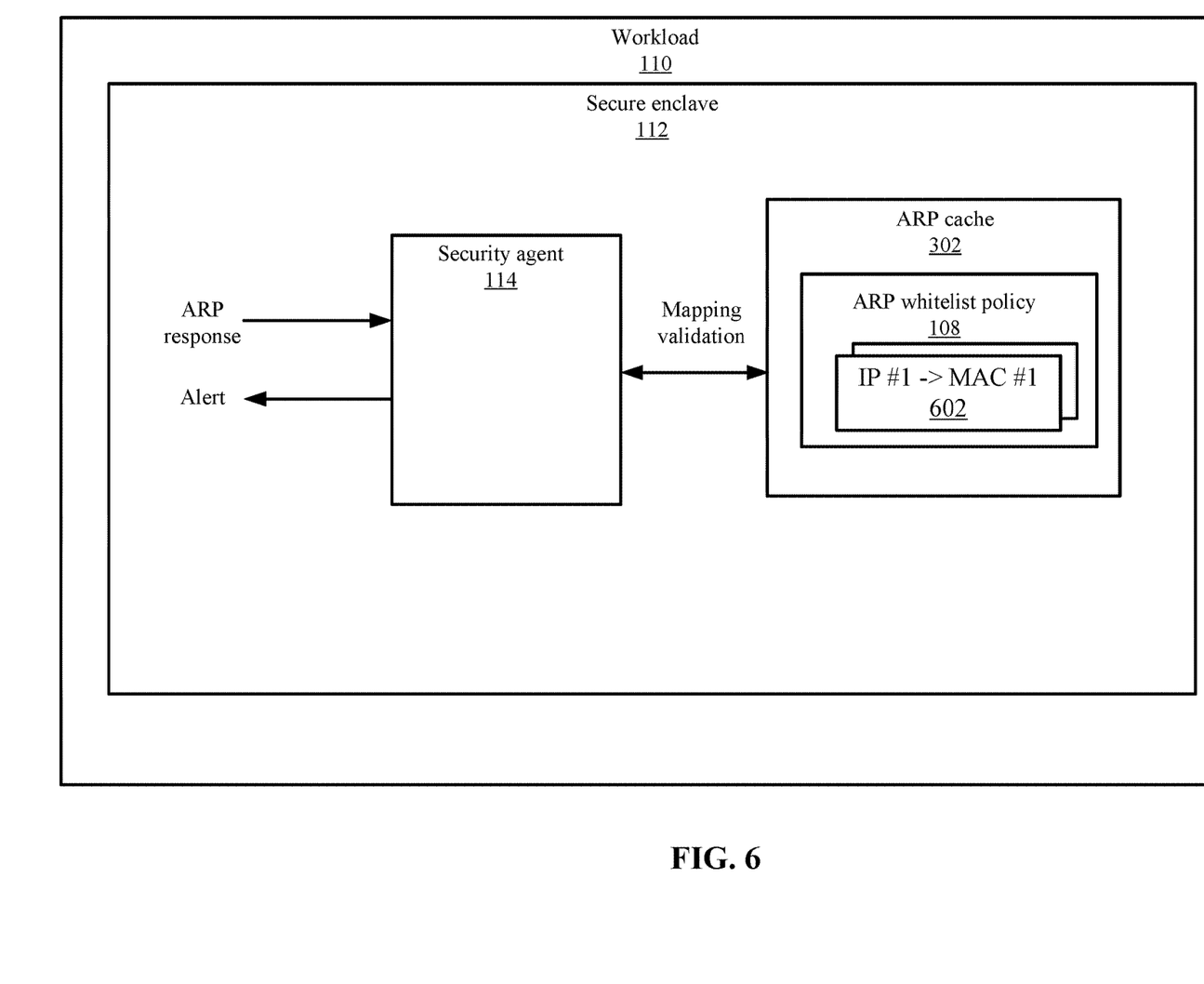
FIG. 6 depicts a more detailed example of the workload during the detection process according to some embodiments.

FIG. 6 depicts a more detailed example of workload 110 during the detection process according to some embodiments. Security agent 114 may intercept an ARP response. Then, security agent 114 may review IP address and MAC address resolution mappings 602 in ARP whitelist policy 108. If a change is detected to an existing IP address and MAC address resolution mapping 602, then security agent 114 may output an alert. In one example, an IP address and MAC address resolution mapping in ARP whitelist policy 108 may be an address resolution mapping 602 of IP address #1 to MAC address #1. The ARP response may be attempting to change the IP address and MAC address resolution mapping to IP address #1→MAC address #X. This is changing the MAC address for IP address IP #1 from MAC address MAC #1 to MAC #X. Security agent 114 detects the change and then can output an alert for immediate remediation.

Conclusion

The above process circumvents an ARP mapping attack, such as an ARP cache poisoning attack, that attempts to change an IP address and MAC address resolution mapping. When a connection is formed, such as a Transport Control Protocol (TCP) connection, security agent 114 may be included in the communications of the connection. For example, a TCP connection may be formed using a three-way handshake mechanism, and security agent 114 may capture communications in all three phases of the TCP connection formation. In each phase, security agent 114 checks whether ARP cache 302 has an entry that is changed to a MAC address. Security agent 114 may block the change and send the ARP request to policy manager 106 for remediation. In this way, security agent 114 may block ARP requests, such as ARP requests from locally-connected network devices. This prevents information of a non-legitimate connection because of an ARP cache poisoning attack and can automatically detect and correct an ARP entry that has been poisoned.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
receiving, by a computing device, a first address resolution mapping from a workload;
verifying, by the computing device, the first address resolution mapping;
when the first address resolution mapping is verified, adding, by the computing device, the first address resolution mapping to a list of address resolution mappings, wherein the list of address resolution mappings includes verified address resolution mappings; and
sending, by the computing device, the list of address resolution mappings to the workload to allow the workload to verify a second address resolution mapping using the list of address resolution mappings.

2. The method of claim 1, wherein verifying the first address resolution mapping comprises:
comparing the first address resolution mapping to address resolution mappings from a source; and
verifying the first address resolution mapping based on an address resolution mapping from the source.

3. The method of claim 1, wherein:
the first address resolution mapping is received for verification during a first phase,
during the first phase, sending a response including information that the first address resolution mapping is verified to the workload; and
upon transitioning to a second phase, the workload uses the list of address resolution mappings to verify the second address resolution mapping.

4. The method of claim 1, wherein the list of address resolution mappings comprises layer 3 address to layer 2 address resolution mappings.

5. The method of claim 1, further comprising:
when the first address resolution mapping is not verified, not adding the first address resolution mapping to the list of address resolution mappings.

6. The method of claim 1, wherein the list of address resolution mappings comprises a first list of address resolution mappings and the workload comprises a first workload, the method further comprising:
generating a second list of address resolution mappings for a second workload to allow the second workload to verify an address resolution mapping using the second list of address resolution mappings, wherein the first list of address resolution mappings is different from the second list of address resolution mappings.

7. The method of claim 1, further comprising:
receiving an alert of a change to an address resolution mapping in the list of address resolution mappings from the workload when the second address resolution mapping attempts to change the address resolution mapping in the list of address resolution mappings.

8. A non-transitory computer-readable storage medium containing instructions, that when executed, control a computer system to be operable for:
receiving a first address resolution mapping from a workload;
verifying the first address resolution mapping;
when the first address resolution mapping is verified, adding the first address resolution mapping to a list of address resolution mappings, wherein the list of address resolution mappings includes verified address resolution mappings; and
sending the list of address resolution mappings to the workload to allow the workload to verify a second address resolution mapping using the list of address resolution mappings.

9. The non-transitory computer-readable storage medium of claim 8, wherein verifying the first address resolution mapping comprises:
comparing the first address resolution mapping to address resolution mappings from a source; and
verifying the first address resolution mapping based on an address resolution mapping from the source.

10. The non-transitory computer-readable storage medium of claim 8, wherein:
the first address resolution mapping is received for verification during a first phase,
during the first phase, sending a response including information that the first address resolution mapping is verified to the workload; and
upon transitioning to a second phase, the workload uses the list of address resolution mappings to verify the second address resolution mapping.

11. The non-transitory computer-readable storage medium of claim 8, wherein the list of address resolution mappings comprises layer 3 address to layer 2 address resolution mappings.

12. The non-transitory computer-readable storage medium of claim 8, further operable for:
when the first address resolution mapping is not verified, not adding the first address resolution mapping to the list of address resolution mappings.

13. The non-transitory computer-readable storage medium of claim 8, wherein the list of address resolution mappings comprises a first list of address resolution mappings and the workload comprises a first workload, further operable for:
generating a second list of address resolution mappings for a second workload to allow the second workload to verify an address resolution mapping using the second list of address resolution mappings, wherein the first list of address resolution mappings is different from the second list of address resolution mappings.

14. The non-transitory computer-readable storage medium of claim 8, further operable for:
receiving an alert of a change to an address resolution mapping in the list of address resolution mappings from the workload when the second address resolution mapping attempts to change the address resolution mapping in the list of address resolution mappings.

15. An apparatus comprising:
one or more computer processors; and
a non-transitory computer-readable storage medium comprising instructions, that when executed, control the one or more computer processors to be operable for:
receiving a first address resolution mapping from a workload;
verifying the first address resolution mapping;
when the first address resolution mapping is verified, adding the first address resolution mapping to a list of address resolution mappings, wherein the list of address resolution mappings includes verified address resolution mappings; and
sending the list of address resolution mappings to the workload to allow the workload to verify a second address resolution mapping using the list of address resolution mappings.

16. The apparatus of claim 15, wherein verifying the first address resolution mapping comprises:

comparing the first address resolution mapping to address resolution mappings from a source; and verifying the first address resolution mapping based on an address resolution mapping from the source.

17. The apparatus of claim 15, wherein:

the first address resolution mapping is received for verification during a first phase, during the first phase, sending a response including information that the first address resolution mapping is verified to the workload; and upon transitioning to a second phase, the workload uses the list of address resolution mappings to verify the second address resolution mapping.

18. The apparatus of claim 15, wherein the list of address resolution mappings comprises layer 3 address to layer 2 address resolution mappings.

19. The apparatus of claim 15, further operable for:

when the first address resolution mapping is not verified, not adding the first address resolution mapping to the list of address resolution mappings.

20. The apparatus of claim 15, wherein the list of address resolution mappings comprises a first list of address resolution mappings and the workload comprises a first workload, further operable for:

generating a second list of address resolution mappings for a second workload to allow the second workload to verify an address resolution mapping using the second list of address resolution mappings, wherein the first list of address resolution mappings is different from the second list of address resolution mappings.

21. The apparatus of claim 15, further operable for:

receiving an alert of a change to an address resolution mapping in the list of address resolution mappings from the workload when the second address resolution mapping attempts to change the address resolution mapping in the list of address resolution mappings.

* * * * *